US012676022B2

(12) United States Patent
Zhao et al.

(10) Patent No.: US 12,676,022 B2
(45) Date of Patent: Jul. 7, 2026

(54) ELECTRONIC DEVICE AND METHOD WITH FACE KEY POINTS DETECTION

(71) Applicant: Samsung Electronics Co., Ltd., Suwon-si (KR)

(72) Inventors: Jian Zhao, Xi'an (CN); Seungju Han, Seoul (KR); Feng Zhu, Xi'an (CN); Han Xu, Xi'an (CN); Jingjing Han, Xi'an (CN); Min Yang, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 807 days.

(21) Appl. No.: 17/860,680

(22) Filed: Jul. 8, 2022

(65) Prior Publication Data

US 2023/0011430 A1     Jan. 12, 2023

(30) Foreign Application Priority Data

Jul. 8, 2021 (CN) .......................... 202110773124.3
May 12, 2022 (KR) ........................ 10-2022-0058248

(51) Int. Cl.
*G06V 40/16* (2022.01)
*G06V 10/48* (2022.01)

(52) U.S. Cl.
CPC ............ *G06V 40/161* (2022.01); *G06V 10/48* (2022.01)

(58) Field of Classification Search
CPC .... G06V 40/161; G06V 10/48; G06V 10/806; G06V 10/82; G06V 40/171
See application file for complete search history.

(56) References Cited

U.S. PATENT DOCUMENTS

| | | | |
|---|---|---|---|
| 9,361,510 B2 | 6/2016 | Yao et al. | |
| 9,471,829 B2 | 10/2016 | Liu et al. | |
| 9,633,250 B2 | 4/2017 | TuZel et al. | |
| 10,068,128 B2 | 9/2018 | Wang et al. | |
| 10,528,839 B2 | 1/2020 | Yao et al. | |
| 2019/0206441 A1* | 7/2019 | De la Torre | G06V 40/171 |
| 2020/0342209 A1 | 10/2020 | Li et al. | |
| 2024/0023884 A1* | 1/2024 | Liu | A61B 5/0205 |
| 2024/0161448 A1* | 5/2024 | Naglestad | G06V 10/761 |

(Continued)

FOREIGN PATENT DOCUMENTS

| | | |
|---|---|---|
| CN | 103824050 B | 3/2017 |
| CN | 106575367 A | 4/2017 |
| CN | 104966046 B | 7/2017 |

(Continued)

OTHER PUBLICATIONS

Zhong, et al. "An attention-guided deep regression model for landmark detection in cephalograms." *International Conference on Medical Image Computing and Computer-Assisted Intervention*. Springer, Cham, Oct. 2019. pp. 1-9.

(Continued)

*Primary Examiner* — Stephen R Koziol
(74) *Attorney, Agent, or Firm* — NSIP Law

(57) ABSTRACT

An electronic device includes a memory configured to store instructions, and a processor configured to execute the instructions to configure the processor to obtain a first heat map feature and a first coordinate value feature based on a face image, and detect a face key point based on the first heat map feature and the first coordinate value feature.

16 Claims, 6 Drawing Sheets

(56) References Cited

U.S. PATENT DOCUMENTS

| | | | | | |
|---|---|---|---|---|---|
| 2026/0004489 | A1* | 1/2026 | He | .......................... | G06T 11/60 |

FOREIGN PATENT DOCUMENTS

| | | | | | | |
|---|---|---|---|---|---|---|
| CN | 106295476 | B | | 5/2019 | | |
| CN | 108399373 | B | | 5/2019 | | |
| CN | 109886121 | A | * | 6/2019 | | |
| CN | 110084219 | A | * | 8/2019 | .......... | G06F 3/0484 |
| CN | 110399809 | A | * | 11/2019 | | |
| CN | 110598601 | A | | 12/2019 | | |
| CN | 111209962 | A | | 5/2020 | | |
| CN | 108615016 | B | | 6/2020 | | |
| CN | 111488779 | A | * | 8/2020 | ............ | G06N 3/045 |
| CN | 111783948 | A | | 10/2020 | | |
| CN | 109214343 | B | | 3/2021 | | |
| CN | 112884637 | A | * | 6/2021 | ......... | G06K 9/00268 |
| JP | 2005-100421 | A | | 4/2005 | | |

OTHER PUBLICATIONS

Iranmanesh, et al. "Robust facial landmark detection via aggregation on geometrically manipulated faces." *Proceedings of the IEEE/CVF Winter Conference on Applications of Computer Vision.* 2020. pp. 330-340.

Wang, et al. "Multistage model for robust face alignment using deep neural networks." *Cognitive Computation* 14.3 (2022): 1123-1139.

Valle, et al. "Face alignment using a 3d deeply-initialized ensemble of regression trees." *Computer Vision and Image Understanding* 189 (2019): p. 102846.

Guo, et al. "PFLD: A practical facial landmark detector." arXiv preprint arXiv:1902.10859 (2019).

Zhao, et al. "Mobilefan: Transferring deep hidden representation for face alignment." *Pattern Recognition* 100 (2020): p. 107114.

Jin, et al. "Pixel-in-pixel net: Towards efficient facial landmark detection in the wild." *International Journal of Computer Vision* 129.12 (2021): pp. 3174-3194.

Sun, et al. "High-resolution representations for labeling pixels and regions." arXiv preprint arXiv:1904.04514 (2019).

Li, et al. "Structured landmark detection via topology-adapting deep graph learning." *European Conference on Computer Vision.* Springer, Cham, 2020. pp. 266-283.

Wang, et al. "Adaptive wing loss for robust face alignment via heatmap regression." *Proceedings of the IEEE/CVF international conference on computer vision.* 2019. pp. 6971-6981.

Chinese Office Action issued on Sep. 12, 2023, in counterpart Chinese Patent Application No. 202110773124.3 (12 pages in English, 9 pages in Chinese).

* cited by examiner

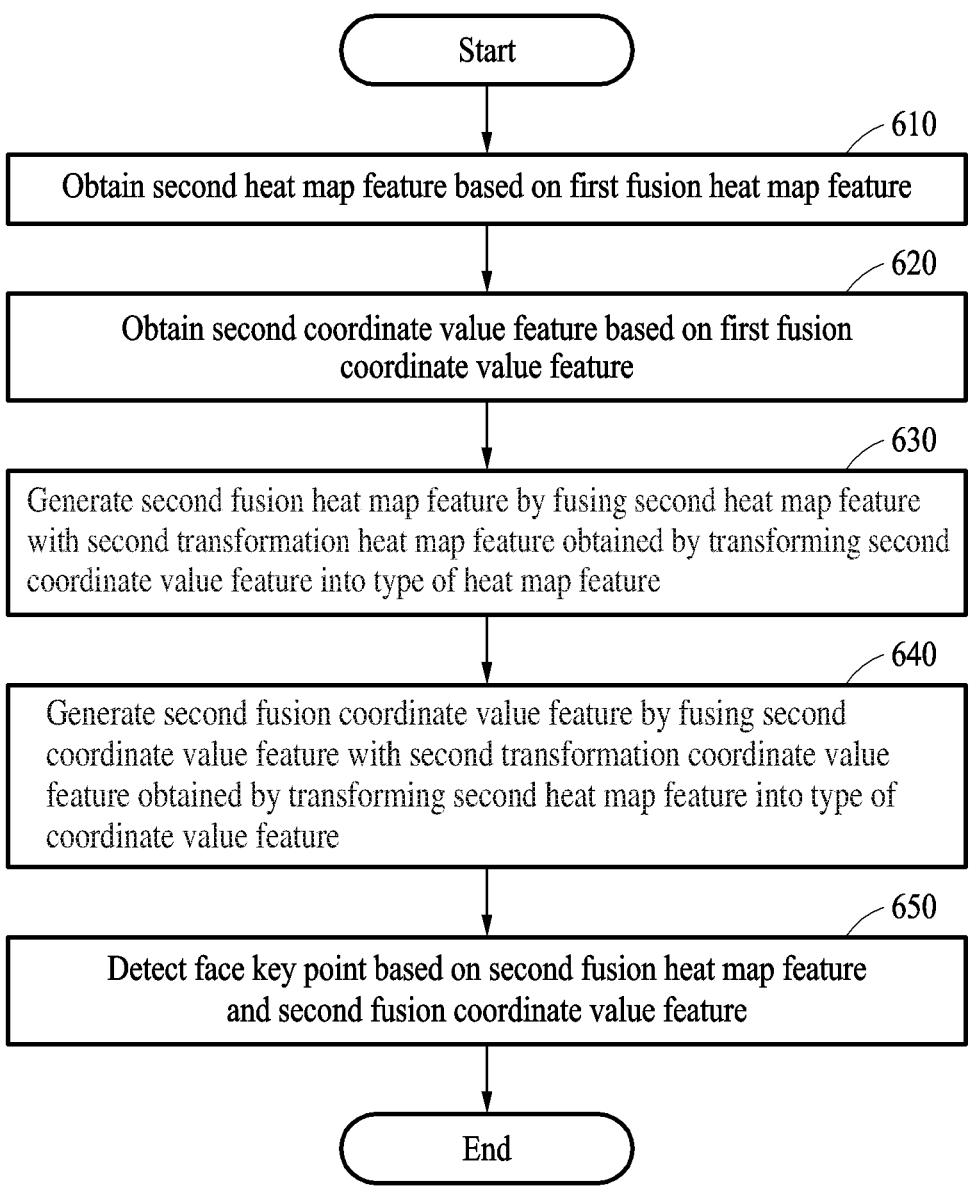

Start

610

Obtain second heat map feature based on first fusion heat map feature

620

Obtain second coordinate value feature based on first fusion coordinate value feature

630

Generate second fusion heat map feature by fusing second heat map feature with second transformation heat map feature obtained by transforming second coordinate value feature into type of heat map feature

640

Generate second fusion coordinate value feature by fusing second coordinate value feature with second transformation coordinate value feature obtained by transforming second heat map feature into type of coordinate value feature

650

Detect face key point based on second fusion heat map feature and second fusion coordinate value feature End

FIG. 6

ELECTRONIC DEVICE AND METHOD WITH FACE KEY POINTS DETECTION

CROSS-REFERENCE TO RELATED APPLICATIONS

This application claims the benefit under 35 USC § 119(a) of Chinese Patent Application No. 202110773124.3 filed on Jul. 8, 2021, at the China National Intellectual Property Administration, and Korean Patent Application No. 10-2022-0058248 filed on May 12, 2022, at the Korean Intellectual Property Office, the entire disclosures of which are incorporated herein by reference for all purposes.

BACKGROUND

1. Field

The following description relates to an electronic device for detecting a face key point and an operating method thereof.

2. Description of Related Art

Unlike identification technology that requires users to perform predetermined movements or actions (e.g., fingerprint recognition, iris recognition, etc.), face detection technology for authenticating a target from afar has drawn attention as a convenient and competitive biometric recognition technology. Due to the convenience and efficiency of face detection technology, face detection technology is widely used in various fields of application (e.g., security systems, mobile authentication, multimedia searching, etc.).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a memory configured to store instructions, and a processor configured to execute the instructions to configure the processor to obtain a first heat map feature and a first coordinate value feature based on a face image, and detect a face key point based on the first heat map feature and the first coordinate value feature.

The processor may further be configured to generate a first fusion heat map feature by fusing the first heat map feature with a first transformation heat map feature obtained by transforming the first coordinate value feature into a heat map feature type, generate a first fusion coordinate value feature by fusing the first coordinate value feature with a first transformation coordinate value feature obtained by transforming the first heat map feature into a coordinate value feature type, and detect the face key point based on the first fusion heat map feature and the first fusion coordinate value feature.

The processor may further be configured to obtain a heat map of the face key point based on the first fusion heat map feature, obtain coordinate value information of the face key point based on the first fusion coordinate value feature, and detect the face key point by obtaining coordinates of the face key point based on the heat map of the face key point and the coordinate value information of the face key point.

The processor may further be configured to obtain the coordinates of the face key point by performing any one of preferential output, an arithmetic mean operation, or a weighted mean operation on coordinates corresponding to the heat map of the face key point and coordinates corresponding to the coordinate value information of the face key point.

The processor may further be configured to obtain a second heat map feature based on the first fusion heat map feature, obtain a second coordinate value feature based on the first fusion coordinate value feature, generate a second fusion heat map feature by fusing the second heat map feature with a second transformation heat map feature obtained by transforming the second coordinate value feature into the heat map feature type, generate a second fusion coordinate value feature by fusing the second coordinate value feature with a second transformation coordinate value feature obtained by transforming the second heat map feature into the coordinate value feature type, and detect the face key point based on the second fusion heat map feature and the second fusion coordinate value feature.

The processor may further be configured to obtain a heat map of the face key point based on the second fusion heat map feature, obtain coordinate value information of the face key point based on the second fusion coordinate value feature, and detect the face key point by outputting coordinates of the face key point based on the heat map of the face key point and the coordinate value information of the face key point.

The processor may further be configured to obtain a first feature comprising information on a generic feature of the face based on the face image, obtain a second feature associated with the first heat map feature and a third feature associated with the first coordinate value feature based on the first feature, obtain the first heat map feature based on the second feature, and obtain the first coordinate value feature based on the third feature.

The processor may further be configured to perform any one of resolution segmentation, channel segmentation, or duplication on the first feature, and obtain the second feature and the third feature based on a result of the performing.

The processor may further be configured to detect the face key point based on a lightweight neural network-based heat map regression model and a lightweight neural network-based coordinate value regression model.

The processor may further be configured to generate the first fusion heat map feature by performing element level multiplication, element level addition, channel splicing, or pixel splicing on the first transformation heat map feature and the first heat map feature, and generate the first fusion coordinate value feature by performing another element level multiplication, element level addition, channel splicing, or pixel splicing on the first transformation coordinate value feature and the first coordinate value feature.

In another general aspect, an operating method of an electronic device includes obtaining, based on a face image, a first heat map feature and a first coordinate value feature; and detecting, based on the first heat map feature and the first coordinate value feature, a face key point.

The detecting of the face key point may include generating a first fusion heat map feature by fusing the first heat map feature with a first transformation heat map feature obtained by transforming the first coordinate value feature into a heat map feature type, generating a first fusion coordinate value feature by fusing the first coordinate value feature with a first transformation coordinate value feature obtained by transforming the first heat map feature into a coordinate value feature type, and detecting, based on the first fusion heat map feature and the first fusion coordinate value feature, the face key point.

The detecting, based on the first fusion heat map feature and the first fusion coordinate value feature, of the face key point may include obtaining, based on the first fusion heat map feature, a heat map of the face key point; obtaining, based on the first fusion coordinate value feature, coordinate value information of the face key point; and detecting, based on the heat map of the face key point and the coordinate value information of the face key point, the face key point by obtaining coordinates of the face key point.

The detecting of the face key point by obtaining the coordinates of the face key point may include obtaining the coordinates of the face key point by performing any one of preferential output, an arithmetic mean operation, or a weighted mean operation on coordinates corresponding to the heat map of the face key point and coordinates corresponding to the coordinate value information of the face key point.

The detecting, based on the first fusion heat map feature and the first fusion coordinate value feature, of the face key point may include obtaining, based on the first fusion heat map feature, a second heat map feature; obtaining, based on the first fusion coordinate value feature, a second coordinate value feature; generating a second fusion heat map feature by fusing the second heat map feature with a second transformation heat map feature obtained by transforming the second coordinate value feature into the heat map feature type; generating a second fusion coordinate value feature by fusing the second coordinate value feature with a second transformation coordinate value feature obtained by transforming the second heat map feature into the coordinate value feature type; and detecting the face key point based on the second fusion heat map feature and the second fusion coordinate value feature.

The detecting, based on the second fusion heat map feature and the second fusion coordinate value feature, of the face key point may include obtaining, based on the second fusion heat map feature, a heat map of the face key point; obtaining, based on the second fusion coordinate value feature, coordinate value information of the face key point; and detecting, based on the heat map of the face key point and the coordinate value information of the face key point, the face key point by outputting coordinates of the face key point.

The obtaining of the first heat map feature and the first coordinate value feature may include obtaining, based on the face image, a first feature comprising information on a generic feature of the face; obtaining, based on the first feature, a second feature associated with the first heat map feature and a third feature associated with the first coordinate value feature; obtaining, based on the second feature, the first heat map feature; and obtaining, based on the third feature, the first coordinate value feature.

The obtaining, based on the first feature, of the second feature associated with the first heat map feature and the third feature associated with the first coordinate value feature may include performing any one of resolution segmentation, channel segmentation, or duplication on the first feature; and obtaining, based on a result of the performing, the second feature and the third feature.

The face key point may include detected based on a lightweight neural network-based heat map regression model and a lightweight neural network-based coordinate value regression model.

The generating of the first fusion heat map feature may include generating the first fusion heat map feature by performing element level multiplication, element level addition, channel splicing, or pixel splicing on the first transformation heat map feature and the first heat map feature. The generating of the first fusion coordinate value feature may include generating the first fusion coordinate value feature by performing element level multiplication, element level addition, channel splicing, or pixel splicing on the first transformation coordinate value feature and the first coordinate value feature.

Other features and aspects will be apparent from the following detailed description, the drawings, and the claims.

BRIEF DESCRIPTION OF THE DRAWINGS

FIG. 6 illustrates an example of an operation of detecting a face key point based on a first fusion heat map feature and a first fusion coordinate value feature.

Figure 1:
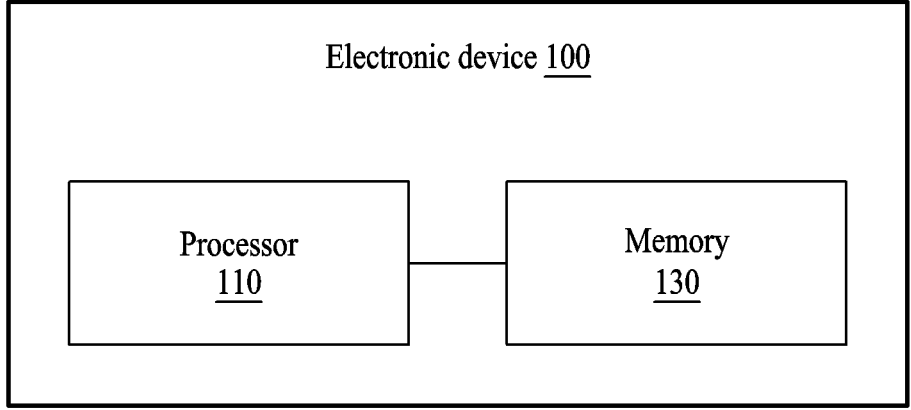
FIG. 1 illustrates an example of an electronic device for detecting a face key point.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after the disclosure of this application is understood. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, devices, and/or systems described herein that will be apparent after the disclosure of this application is understood.

As used herein, the term "and/or" includes any one and any combination of any two or more of the associated listed items.

As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof.

Although terms such as "first," "second," and "third" may be used herein to describe various members, components, regions, layers, or sections, these members, components, regions, layers, or sections are not to be limited by these terms (e.g., "first," "second," and "third"). Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

The terminology used herein is for describing various examples only, and is not to be used to limit the disclosure. The singular forms are intended to include the plural forms as well, unless the context clearly indicates otherwise. The terms "comprises," "includes," and "has" describe the presence of stated features, numbers, operations, components, elements, and/or combinations thereof, but do not preclude the presence or addition of one or more other features, numbers, operations, components, elements, and/or combinations thereof.

Unless otherwise defined, all terms including technical and scientific terms used herein may have the same meaning as commonly understood after an understanding of the disclosure of this application. Terms, such as those defined in commonly used dictionaries, are to be interpreted as having a meaning that is consistent with their meaning in the context of the relevant art and the disclosure of the present application, unless expressly so defined herein.

Hereinafter, examples will be described in detail with reference to the accompanying drawings. When describing the examples with reference to the accompanying drawings, like reference numerals refer to like elements and any repeated description related thereto will be omitted.

Face key point detection may be desired as a part of face detection technology. However, as face images are obtained under various conditions, application scenarios of face detection may vary. A face key point detection technology that is accurate and rapid may be desired.

Various examples may perform face key point detection by simultaneously using a heat map feature and a coordinate value feature obtained based on a face image, and thereby detect a face key point accurately and quickly.

Face key point detection technology, based on a traditional image processing technology, entered a new phase in 2013. Deep learning technology has been used in face key point detection since 2013, and accordingly, the performance of face key point detection has been rapidly improving.

Face key point detection technology may include an active shape model, an active appearance model, a cascaded pose regression, and the like. A result of face key point detection using these technologies may be adequate if a predetermined condition is satisfied, but the result may not be robust if the predetermined condition is not satisfied, for example, when a photo captured without any environmental limitations is used.

Deep learning-based detection technology may be divided into two categories, coordinate regression and heat map regression. Neural network-based coordinate regression technology may receive a face image and directly output coordinates of a key point. Coordinate regression technology may have the advantage of providing a high inference rate. Neural network-based heat map regression technology receives a face image and outputs a plurality of heat maps. A heat map and a key point correspond to each other, and a position of a key point may be a position of a "hottest" point in the heat map. Neural network-based heat map regression technology may have the advantage of providing high detection accuracy.

Face key point technology, which provides high accuracy, a high inference rate, and excellent robustness, may be desired. Coordinate regression technology may have the advantages of providing increased robustness, fast inference, and being usable in real-time applications, but coordinate regression technology may have the disadvantage of providing low detection accuracy. For example, an inference rate of coordinate regression technology may reach a real-time level (e.g., more than 30 frames per second (fps)), and the accuracy of coordinate regression technology may exceed 3.40% (lower is better) in a validation set of a 300 W dataset. Although heat map regression technology may have the advantage of providing high detection accuracy, heat map regression technology may provide a low inference rate (e.g., less than 20 fps), making it hard to reach a real-time level and may reduce robustness. Therefore, it may be difficult to use heat map regression technology in practical applications.

A method of detecting a face key point may simultaneously detect a face key point using a heat map feature and a coordinate value feature extracted based on a face image, thereby providing high detection accuracy and a high inference rate.

FIG. 1 illustrates an example of an electronic device for detecting a face key point.

An electronic device 100 may accurately and quickly detect a face key point simultaneously using a heat map feature and a coordinate value feature obtained based on a face image. A heat map may include information on a position of the face key point, and the heat map feature may include information on a heat map of the face key point. The coordinate value feature may include information on coordinates of the face key point.

The electronic device 100 may obtain a feature suitable for a face key point detection situation using various schemes (e.g., feature separation scheme) of obtaining a feature.

The electronic device 100 may reduce the number of operations required to extract the heat map feature and the coordinate value feature using a generic feature extraction model and may have good real-time performance.

The electronic device 100 may realize high detection accuracy and/or excellent real-time performance by detecting the face key point based on a fusion heat map feature and a fusion coordinate value feature. The fusion heat map feature may include feature information corresponding to the heat map feature and feature information corresponding to the coordinate value feature (e.g., a coordinate value feature which is transformed into a heat map feature type).

The fusion coordinate value feature may include feature information corresponding to the coordinate value feature and feature information corresponding to the heat map feature (e.g., a heat map feature which is transformed into a coordinate value feature type).

The electronic device 100 may use feature information having different scales by performing an operation of extracting the heat map feature and the coordinate value feature multiple times and performing an operation of fusing the heat map feature with the coordinate value feature multiple times. The electronic device 100 may provide improved detection accuracy and real-time performance by detecting the face key point based on a plurality of fusion features.

The electronic device 100 may globally reflect a feature of the face image and provide improved robustness using a feature multi-mode multi-scale fusion model, a coordinate value regression model, and a heat map regression model.

The electronic device 100 may improve an inference rate and execution speed of an entire network using a lightweight neural network-based heat map regression model and a lightweight neural network-based coordinate value regression model.

The electronic device 100 may include a processor 110 and a memory 130.

The processor 110 may process data stored in the memory 130. For example, the processor 110 may execute computer-readable codes (e.g., software) stored in the memory 130, and instructions triggered by the processor 110.

The processor 110 may be a hardware-implemented data processing device with a physically structured circuit to execute desired operations. The desired operations may include, for example, code or instructions in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 110 may obtain the heat map feature and the coordinate value feature based on the face image, and detect the face key point based on the heat map feature and the coordinate value feature. An operation of detecting the face key point performed by the processor 110 will be described in further detail with reference to FIGS. 2 and 3.

The memory 130 may store data for an operation or an operation result. The memory 130 may store instructions (or programs) executable by the processor 110. For example, the instructions may include instructions for executing an operation of the processor 110 and/or an operation of each component of the processor 110.

The memory 130 may be implemented as a volatile memory device or a non-volatile memory device.

The volatile memory device may be implemented as dynamic random access memory (DRAM), static random access memory (SRAM), thyristor RAM (T-RAM), zero capacitor RAM (Z-RAM), or twin transistor RAM (TTRAM).

The non-volatile memory device may be implemented as electrically erasable programmable read-only memory (EE-PROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, or insulator resistance change memory.

The memory 130 may store data. The memory 130 may store the face image.

Hereinafter, the operation of detecting the face key point performed by the processor 110 is described in detail.

Figure 2:
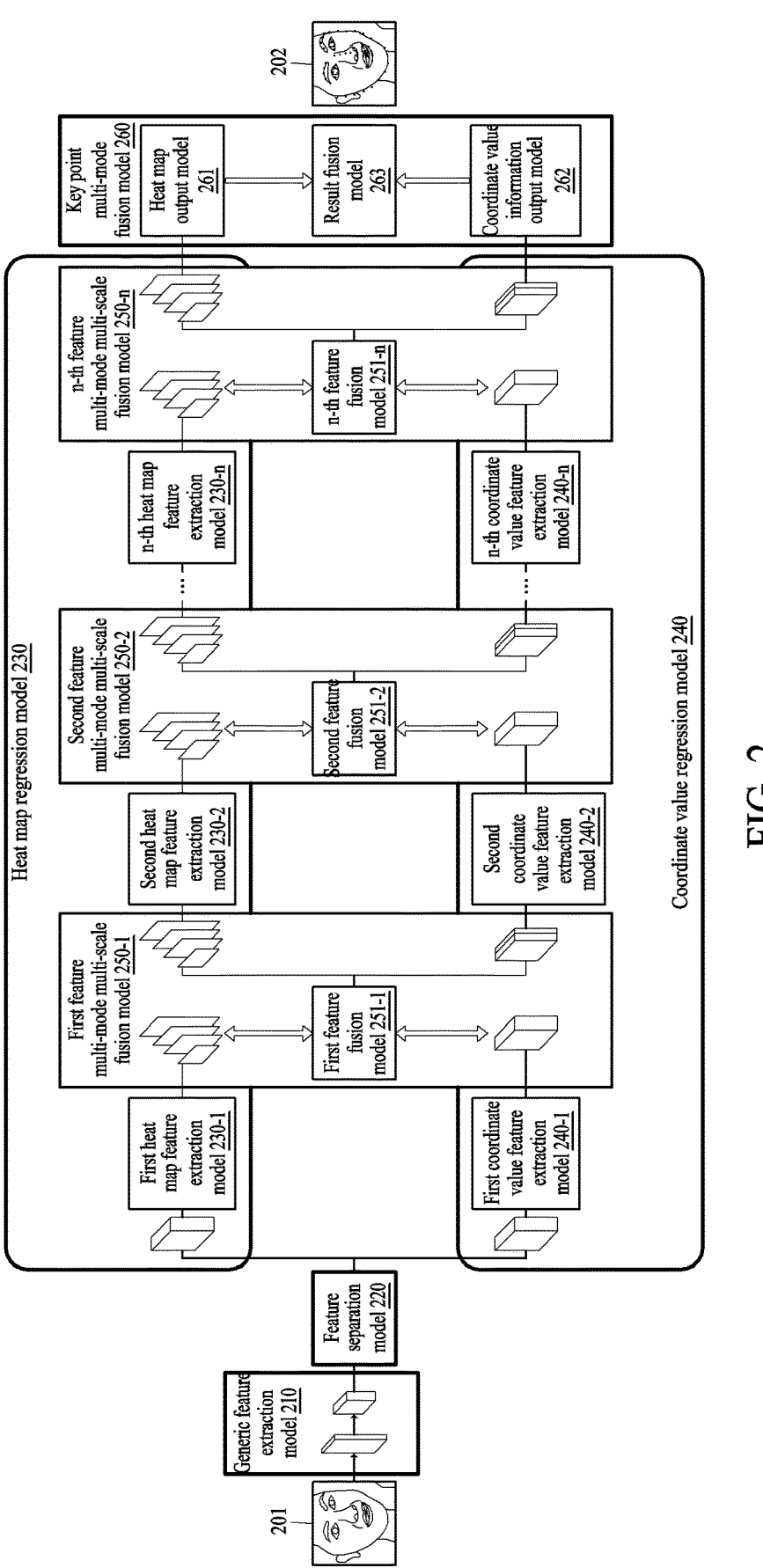
FIG. 2 illustrates an example of a neural network-based face key point extraction model.

FIG. 2 illustrates an example of a neural network-based face key point extraction model.

Referring to FIG. 2, a processor (e.g., the processor 110 of FIG. 1) may detect a face key point based on a face image 201. The processor 110 may output a face image 202, including the face key point. A face image may include all or one or more parts of a face (e.g., an eye, a nose, an eyebrow, a mouth and/or a face, etc.). The face image 201 may be stored in a memory (e.g., the memory 130 of FIG. 1). The face image 201 may be obtained in various ways. A face key point may mean one or more parts of a face (e.g., an eye, a nose, an eyebrow, a mouth and/or a face, etc.) and a boundary between the parts. The electronic device 100 may accurately and quickly detect a face key point simultaneously using a heat map feature and a coordinate value feature obtained based on a face image.

The processor 110 may obtain a first feature (e.g., a first feature including information on a generic feature of a face) from the face image 201 based on a generic feature extraction model 210. A generic feature of a face may include a face, eyes, nose, ears, mouth, teeth, chin, hair, eyebrow, etc. The first feature may be used to extract the heat map feature and the coordinate value feature. The electronic device 100 may reduce the number of operations required to extract the heat map feature and the coordinate value feature using the generic feature extraction model 210 and may provide good real-time performance.

The processor 110 may obtain a second feature and a third feature from the first feature based on a feature separation model 220. The second feature may be associated with the heat map feature, and the third feature may be associated with the coordinate value feature. The processor 110 may perform any one or any combination of any two or more of resolution segmentation, channel segmentation, and replication on the first feature, and obtain the second feature and the third feature based on a result of the performed resolution segmentation, channel segmentation, and/or replication on the first feature. For example, if the processor 110 performs replication on the first feature, the second feature and the third feature may be identical to each other. The electronic device 100 may obtain a feature suitable for a face key point detection situation using various schemes (e.g., a feature separation scheme) for obtaining a feature.

The processor 110 may obtain a first heat map feature from the second feature based on a first heat map feature extraction model 230-1 included in a lightweight neural network-based heat map regression model 230. The processor 110 may obtain a first coordinate value feature from the third feature based on a first coordinate value feature extraction model 240-1 included in a lightweight neural network-based coordinate value regression model 240. Lightening a neural network, e.g., to create a lightweight neural network, may mean using technology to reduce the parameters of a neural network to reduce the number of operations. The electronic device 100 may improve the inference rate and an execution speed of an entire network using the lightweight neural network-based heat map regression model 230 and the lightweight neural network-based coordinate value regression model 240.

The processor 110 may generate a first fusion heat map feature based on a first feature fusion model 251-1 included in a first feature multi-mode multi-scale fusion model 250-1. The first fusion heat map feature may be generated by fusing the first heat map feature with a first transformation heat map feature obtained by transforming the first coordinate value feature into a heat map feature type. The heat map feature type may have a data type corresponding to the heat map feature, and the first transformation heat map feature may have a data type corresponding to the heat map feature. The processor 110 may generate the first fusion heat map feature by performing element level multiplication, element level addition, channel splicing, or pixel splicing on the first transformation heat map feature and the first heat map feature. The first fusion heat map feature may include feature information corresponding to the first heat map feature and feature information corresponding to the first coordinate value feature (e.g., the first coordinate value feature which is transformed into a heat map feature type).

The processor 110 may generate a first fusion coordinate value feature based on the first feature fusion model 251-1 included in the first feature multi-mode multi-scale fusion model 250-1. The first fusion coordinate value feature may be generated by fusing the first coordinate value feature with a first transformation coordinate value feature obtained by transforming the first heat map feature into a coordinate value feature type. The coordinate value feature type may have a data type corresponding to the coordinate value feature, and the first transformation coordinate value feature may have a data type corresponding to the coordinate value feature. The processor 110 may generate the first fusion coordinate value feature by performing element level multiplication, element level addition, channel splicing, or pixel splicing on the first transformation coordinate value feature and the first coordinate value feature. The first fusion coordinate value feature may include feature information corresponding to the first coordinate value feature and feature information corresponding to the first heat map feature (e.g., the first heat map feature, which is transformed into a coordinate value feature type).

The processor 110 may, for example, perform channel splicing. Channel splicing may be expressed through Equation 1.

$$F_h = \{F_{hi}^{m_{hi} \times n_{hi}} \mid \cdot i = 1, 2, \dots, s\} \qquad \text{Equation 1}$$

$$F_c = \{F_{ci}^{m_{ci} \times n_{ci}} \mid \cdot i = 1, 2, \dots, r\}$$

$$g_{hc} \colon F_{hi} \to \cdot F_{h\_ci}^{m_{ci} \times n_{ci}} \cdot (F_{hi} \in F_h)$$

$$g_{ch} \colon F_{ci} \to \cdot F_{c\_hi}^{m_{hi} \times n_{hi}} \cdot (F_{ci} \in F_c)$$

$$F_{h\_c} = \{F_{h\_ci}^{m_{ci} \times n_{ci}} \mid \cdot F_{h\_ci}^{m_{ci} \times n_{ci}} = g_{hc}(F_{hi}), i = 1, 2, \dots, s\}$$

$$F_{c\_h} = \{F_{c\_hi}^{m_{hi} \times n_{hi}} \mid \cdot F_{c\_hi}^{m_{hi} \times n_{hi}} = g_{ch}(F_{ci}), i = 1, 2, \dots, r\}$$

$$F_{fused\_h} = F_h \oplus F_{c\_h}$$

$$F_{fused\_c} = F_c \oplus F_{h\_c}$$

In Equation 1, $F_h$ denotes a heat map feature, $F_c$ denotes a coordinate value feature, $$F_{hi}^{m_{hi} \times n_{hi}}$$

denotes an i-th feature of $F_h$, $m_i \times n_i$ denotes a resolution, $$F_{ci}^{m_{ci} \times n_{ci}}$$

denotes an i-th feature of $F_c$, $F_{h\_c}$ denotes a transformation coordinate value feature, $F_{c\_h}$ denotes a transformation heat map feature, $g_{hc}$ that denotes mapping from $F_{hi}$ to $F_{h\_ci}$ is used to transform a heat map feature into a coordinate feature type, Ich that denotes mapping from $F_{ci}$ to $F_{c\_hi}$ is used to transform a coordinate value feature into a heat map feature type, $F_{fused\_h}$ denotes a fusion heat map feature, $F_{fused\_c}$ denotes a fusion coordinate value feature, and $\oplus$ denotes a channel splicing operator. However, these are merely examples, and a scheme of obtaining a fusion feature is not limited to channel splicing. The electronic device 100 may realize high detection accuracy and/or excellent real-time performance by detecting the face key point based on a fusion heat map feature and a fusion coordinate value feature.

The processor 110 may obtain a second heat map feature from the first fusion heat map feature based on a second heat map feature extraction model 230-2 included in the lightweight neural network-based heat map regression model 230. The processor 110 may obtain a second coordinate value feature from the first fusion coordinate value feature based on a second coordinate value feature extraction model 240-1 included in the lightweight neural network-based coordinate value regression model 240. A scheme for obtaining the second heat map feature and the second coordinate value feature may be similar to a scheme for obtaining the first heat map feature and the first coordinate value feature. Therefore, detailed descriptions of the scheme for obtaining the second heat map feature and the second coordinate value feature have been omitted for ease of description.

The processor 110 may generate a second fusion heat map feature and a second fusion coordinate value feature based on a second feature fusion model 251-2 included in a second feature multi-mode multi-scale fusion model 250-2. A scheme for generating the second fusion heat map feature and the second fusion coordinate value feature may be similar to the scheme for generating the first fusion heat map feature and the first fusion coordinate value feature. Therefore, detailed descriptions of the scheme of obtaining the second fusion heat map feature and the second fusion coordinate value feature have been omitted for ease of description.

The processor 110, when desired, may obtain an n-th fusion heat map feature and an n-th fusion coordinate value feature based on an n-th heat map feature and an n-th coordinate value feature, and detect the face key point based on the n-th fusion heat map feature and the n-th fusion coordinate value feature (n denotes an integer greater than or equal to 1). The electronic device 100 may use feature information having different scales by performing an operation of extracting the heat map feature and the coordinate value feature multiple times and performing an operation of fusing the heat map feature with the coordinate value feature multiple times. The electronic device 100 may provide improved detection accuracy and real-time performance by detecting the face key point based on a plurality of fusion features.

The processor 110 may obtain a heat map of the face key point from the n-th fusion heat map feature based on a heat map output model 261 included in a key point multi-mode fusion model 260. The processor 110 may obtain coordinate value information of the face key point from the n-th fusion coordinate value feature based on a coordinate value information output model 262 included in the key point multi-mode fusion model 260. The processor 110 may obtain coordinates of the face key point by performing one of preferential output, an arithmetic mean operation, or a weighted mean operation on coordinates corresponding to the heat map of the face key point and coordinates corresponding to the coordinate value information of the face key point based on a result fusion model 263.

The processor 110 may preferentially output one of the key point coordinates corresponding to the heat map of the face key point and key point coordinates corresponding to the coordinate value information of the face key point. The processor 110 may perform an arithmetic mean operation on the key point coordinates corresponding to the heat map of the face key point and the key point coordinates corresponding to the coordinate value information of the face key point. The processor 110 may perform a weighted mean operation on the key point coordinates corresponding to the heat map of the face key point and the key point coordinates corresponding to the coordinate value information of the face key point.

The processor 110 may, for example, perform a weighted mean operation. A weighted mean operation may be expressed through Equation 2.

$$eh_i = \frac{\sqrt{(ph_{ix} - g_{ix})^2 + (ph_{iy} - g_{iy})^2}}{d_{interOcular}} \quad \text{Equation 2}$$

$$ec_i = \frac{\sqrt{(pc_{ix} - g_{ix})^2 + (pc_{iy} - g_{iy})^2}}{d_{interOcular}}$$

$$\omega c_i = \frac{eh_i}{ec_i + eh_i}$$

$$wh_i = \frac{ec_i}{ec_i + eh_i}$$

$$pf_i(x, y) = \omega h_i \times ph_i(x, y) + \omega c_i \times pc_i(x, y)$$

In Equation 2, $(ph_{ix}, ph_{iy})$ denotes coordinates (e.g., coordinates of an i-th key point) corresponding to an i-th heat map, $(pc_{ix}, pc_{iy})$ denotes coordinates (e.g., the coordinates of the i-th key point) corresponding to i-th coordinate value information, $(g_{ix}, g_{iy})$ denotes measured coordinates of the i-th key point, $d_{interOcular}$ denotes a Euclidean distance between a left outer canthus and a right outer canthus of a face, $eh_i$ denotes an error of the i-th key point corresponding to the i-th heat map, $ec_i$ denotes an error of the i-th key point corresponding to i-th coordinate value information, $\omega c_i$ denotes a weight of the i-th key point corresponding to the i-th coordinate value information, $wh_i$ denotes a weight of the i-th key point corresponding to the i-th heat map, $ph_i(x, y)$ denotes coordinates (e.g., the coordinates of the i-th key point) corresponding to the i-th coordinate value, $pc_i(x, y)$ denotes coordinates (e.g., the coordinates of the i-th key point) corresponding to the i-th coordinate value, and $pf_i(x, y)$ denotes a final output result (e.g., final estimated coordinates), which is also a final output of a network, with respect to the i-th key point.

The processor 110 may perform an arithmetic mean operation by setting a weight of Equation 2 (e.g., $\omega c_i$ and $\omega h_i$) to "1". The electronic device 100 may globally reflect a feature of the face image and provide improved robustness using a multi-mode multi-scale fusion model, a coordinate value regression model, and a heat map regression model.

Figure 3:
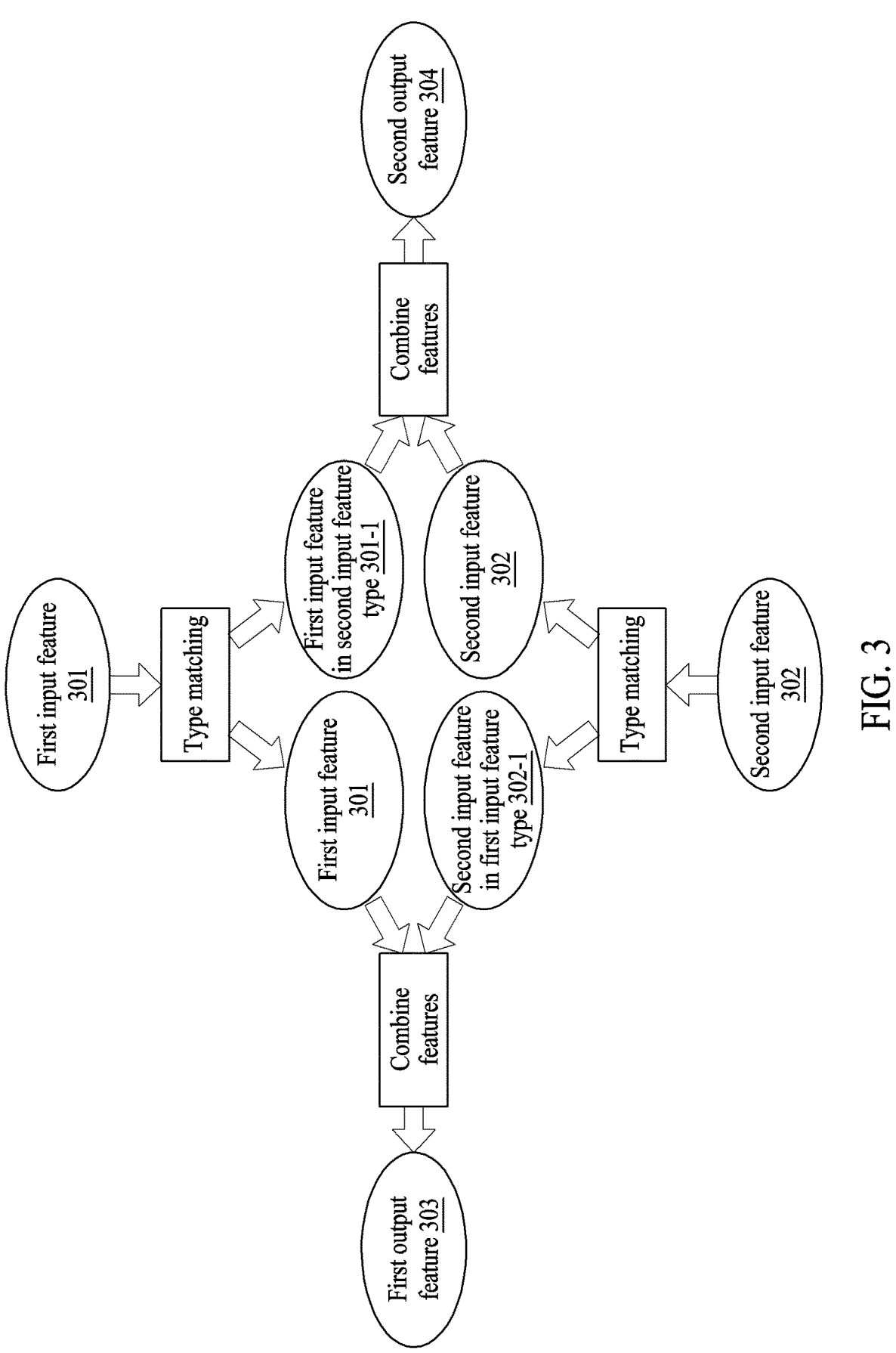
FIG. 3 illustrates an example of a feature fusion model operation illustrated in FIG. 2.

FIG. 3 illustrates an example of a feature fusion model operation model illustrated in FIG. 2.

Referring to FIG. 3, a first input feature 301 may be one of a coordinate value feature or a heat map feature, and a second input feature 302 may be another one of the coordinate value feature or the heat map feature.

A processor (e.g., the processor 110 of FIG. 1) may obtain the first input feature 301 and a first input feature in a second input feature type 301-1 by performing type matching on the first input feature 301. The second input feature format may indicate a data type corresponding to the second input feature. Similarly, the processor 110 may obtain the second input feature 302 and a second input feature in a first input feature type 302-1 by performing type matching on the second input feature 302. The first input feature format may have a data type corresponding to the first input feature.

The processor 110 may combine (or fuse) the first input feature 301 and the second input feature in the first input feature type 302-1. The processor 110 may generate a first output feature 303 by performing element level multiplication, element level addition, channel splicing, or pixel splicing on the first input feature 301 and the second input feature in the first input feature type 302-1. Similarly, the processor 110 may combine (or fuse) the second input feature 302 and the first input feature in the second input feature type 301-1. The processor 110 may generate a second output feature 304 by performing element level multiplication, element level addition, channel splicing, or pixel splicing on the second input feature 302 and the second input feature in the first input feature type 302-1.

The first output feature 303 may indicate one of a fusion coordinate value feature or a fusion heat map feature, and the second output feature 304 may indicate another one of the fusion coordinate value feature or the fusion heat map feature. For example, the electronic device 100 may realize high detection accuracy and/or excellent real-time performance by detecting a face key point based on a fusion heat map feature and a fusion coordinate value feature.

Figures 4, 5:
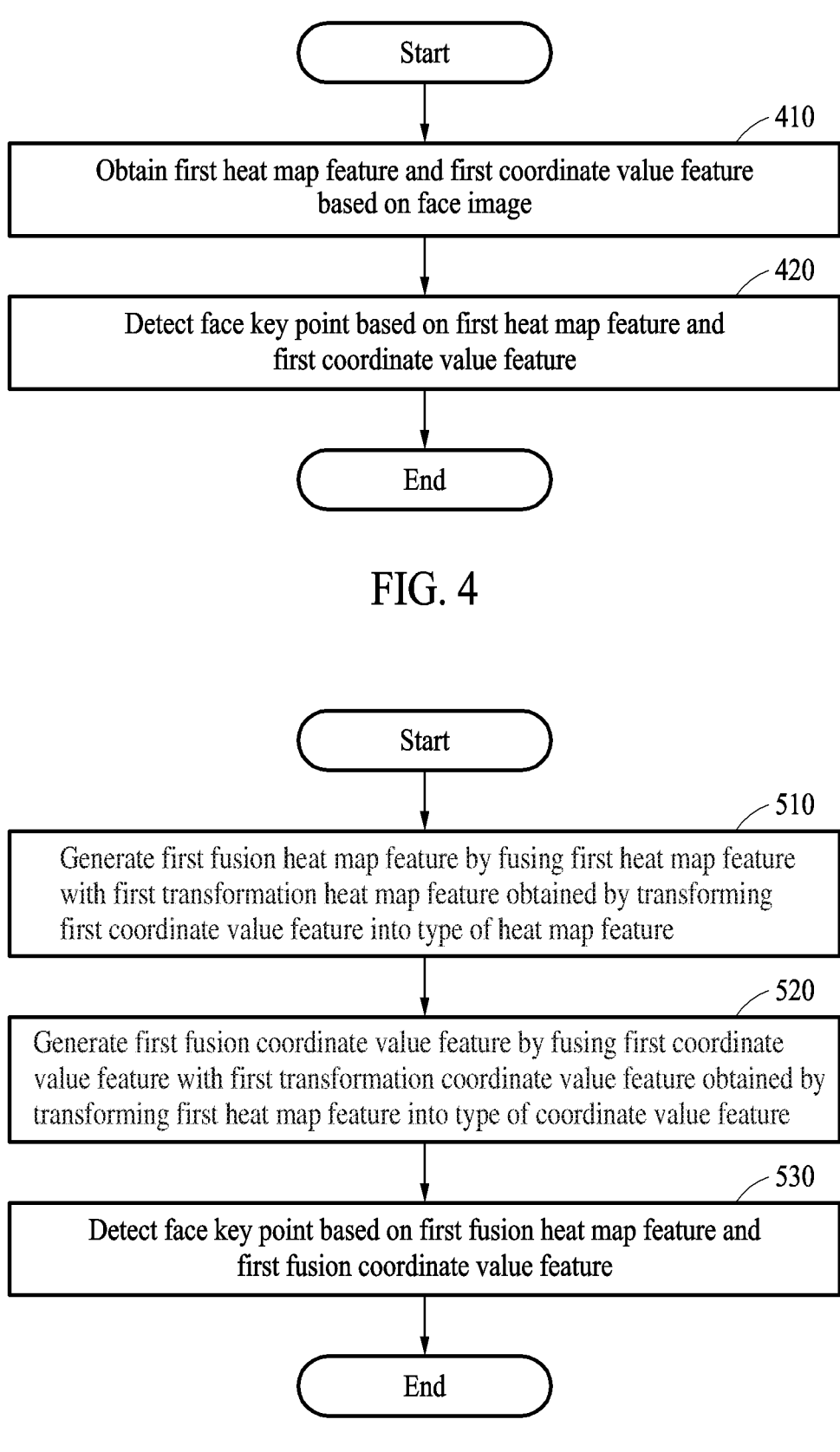
FIG. 4 illustrates an example of an operation of detecting a face key point.
FIG. 5 illustrates an example of an operation of detecting a face key point based on a first heat map feature and a first coordinate value feature.

FIG. 4 illustrates an example of an operation of detecting a face key point.

In operation 410, a processor (e.g., the processor 110 of FIG. 1) may obtain a first heat map feature and a first coordinate value feature based on a face image. The face image may include all or one or more parts of a face (e.g., an eye, a nose, an eyebrow, a mouth and/or a face, etc.). A heat map may include information on the position of the face key point, and the heat map feature may include information on a heat map of the face key point. The coordinate value feature may include information on coordinates of the face key point.

In operation 420, the processor 110 may detect the face key point based on the first heat map feature and the first coordinate value feature. The face key point may mean one or more parts of a face (e.g., an eye, a nose, an eyebrow, a mouth and/or a face, etc.) and a boundary between the parts. Hereinafter, operation 420 will be described in more detail with reference to FIG. 5.

FIG. 5 illustrates an example of an operation of detecting a face key point based on a first heat map feature and a first coordinate value feature.

In operation 510, a processor (e.g., the processor 110 of FIG. 1) may generate a first fusion heat map feature by fusing the first heat map feature with a first transformation heat map feature obtained by transforming the first coordinate value feature into a heat map feature type. The first fusion heat map feature may include feature information corresponding to the first heat map feature and feature information corresponding to the first coordinate value feature (e.g., the first coordinate value feature which is transformed into a heat map feature type). The processor 110 may generate the first fusion heat map feature by performing element level multiplication, element level addition, channel splicing, or pixel splicing on the first transformation heat map feature and the first heat map feature.

In operation 520, the processor 110 may generate a first fusion coordinate value feature by fusing the first coordinate value feature with a first transformation coordinate value feature obtained by transforming the first heat map feature into a coordinate value feature type. The first fusion coordinate value feature may include feature information corresponding to the first coordinate value feature and feature information corresponding to the first heat map feature (e.g., the first heat map feature, which is transformed into a coordinate value feature type). The processor 110 may generate the first fusion coordinate value feature by performing element level multiplication, element level addition, channel splicing, or pixel splicing on the first transformation coordinate value feature and the first coordinate value feature.

In operation 530, the processor 110 may detect a face key point based on the first fusion heat map feature and the first fusion coordinate value feature. Hereinafter, operation 530 will be described in more detail with reference to FIG. 6.

FIG. 6 illustrates an example of an operation of detecting a face key point based on a first fusion heat map feature and a first fusion coordinate value feature.

In operation 610, a processor (e.g., the processor 110 of FIG. 1) may obtain a second heat map feature based on the first fusion heat map feature.

In operation 620, the processor 110 may obtain a second coordinate value feature based on the first fusion coordinate value feature.

In operation 630, the processor 110 may generate a second fusion heat map feature by fusing the second heat map feature with a second transformation heat map feature obtained by transforming the second coordinate value feature into a heat map feature type. The operation of generating the second fusion heat map feature may be similar to the operation of generating the first fusion heat map feature.

In operation 640, the processor 110 may generate a second fusion coordinate value feature by fusing the second coordinate value feature with the second transformation heat map feature obtained by transforming the second heat map feature into a coordinate value feature type. The operation of generating the second fusion coordinate value feature may be similar to the operation of generating the first fusion coordinate value feature.

In operation 650, the processor 110 may detect a face key point based on the second fusion heat map feature and the second fusion coordinate value feature. The processor 110, if necessary, may obtain an n-th fusion heat map feature and an n-th fusion coordinate value feature based on an n-th heat map feature and an n-th coordinate value feature, and detect the face key point based on the n-th fusion heat map feature and the n-th fusion coordinate value feature (n denotes an integer greater than or equal to 1). Herein, as an example, it is described that the processor 110 may detect the face key point based on the second fusion heat map feature and the second fusion coordinate value feature, but the examples are not limited thereto. Hereinafter, operation 650 will be described in more detail with reference to FIG. 7.

Figure 7:
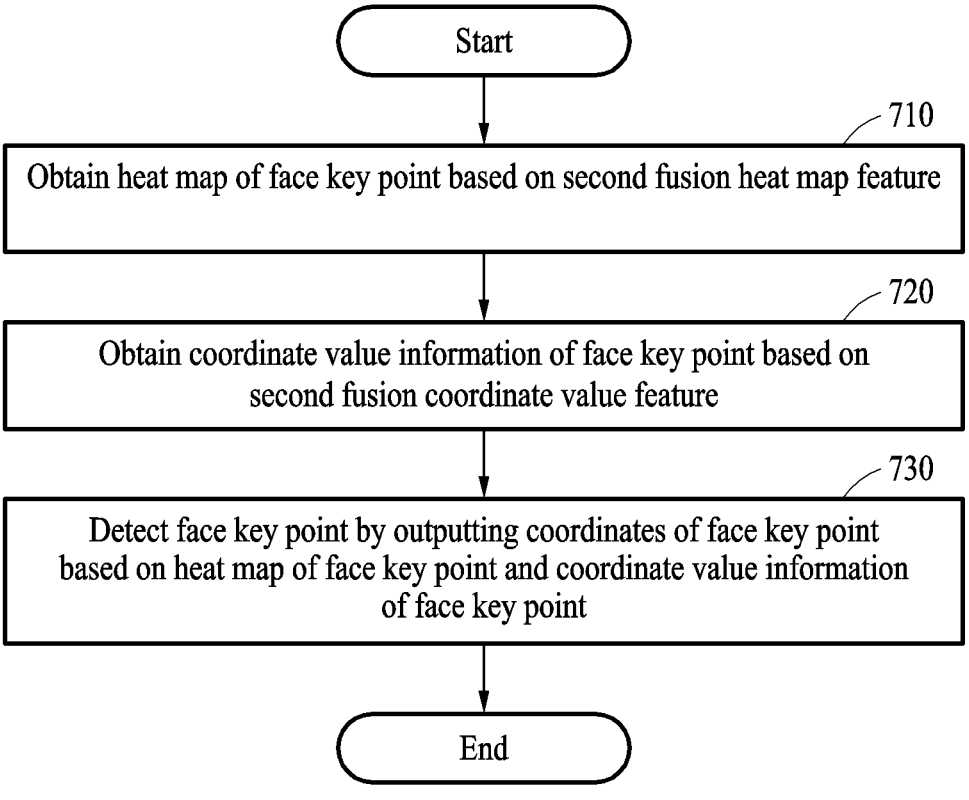
FIG. 7 illustrates an example of an operation of detecting a face key point based on a second fusion heat map feature and a second fusion coordinate value feature.

FIG. 7 illustrates an example of an operation of detecting a face key point based on a second fusion heat map feature and a second fusion coordinate value feature.

In operation 710, a processor (e.g., the processor 110 of FIG. 1) may obtain a heat map of the face key point based on a second fusion heat map feature.

In operation 720, the processor 110 may obtain coordinate value information of the face key point based on a second fusion coordinate value feature.

In operation 730, the processor 110 may detect the face key point by outputting coordinates of the face key point based on the heat map of the face key point and the coordinate value information of the face key point. The processor 110 may obtain the coordinates of the face key point by performing one of preferential output, an arithmetic mean operation, or a weighted mean operation on coordinates corresponding to the heat map of the face key point and the coordinate value information of the face key point.

The method of detecting a face key point in the present disclosure may detect a face key point simultaneously using a heat map feature and a coordinate value feature obtained based on a face image, thereby detecting the face key point accurately and relatively quickly. A heat map may include information on a position of the face key point, and the heat map feature may include information on a heat map of the face key point. The coordinate value feature may include information on coordinates of the face key point.

The method of detecting a face key point in the present disclosure may obtain a feature suitable for a face key point detection situation using various schemes (e.g., a feature separation scheme) for obtaining a feature.

The method of detecting a face key point in the present disclosure may reduce the number of operations required to extract a heat map feature and a coordinate value feature using a generic feature extraction model and may provide good real-time performance.

The method of detecting a face key point in the present disclosure may realize high detection accuracy and/or excellent real-time performance by detecting a face key point based on a fusion heat map feature and a fusion coordinate value feature. The fusion heat map feature may include feature information corresponding to the heat map feature and feature information corresponding to the coordinate value feature (e.g., a coordinate value feature which is transformed into a heat map feature type). The fusion coordinate value feature may include feature information corresponding to the coordinate value feature and feature information corresponding to the heat map feature (e.g., a heat map feature which is transformed into a coordinate value feature type).

The method of detecting a face key point in the present disclosure may use feature information having different scales by performing an operation of extracting the heat map feature and the coordinate value feature multiple times and performing an operation of fusing the heat map feature and the coordinate value feature multiple times. The electronic device 100 may provide improved detection accuracy and real-time performance by detecting the face key point based on a plurality of fusion features.

The method of detecting a face key point of the present disclosure may globally reflect a feature of a face image and provide improved robustness using a multi-mode multi-scale fusion model, a coordinate value regression model, and a heat map regression model.

The method of detecting a face key point in the present disclosure may improve an inference rate and an execution speed of an entire network using a lightweight neural network-based heat map regression model and a lightweight neural network-based coordinate value regression model.

The electronic device 100 in FIGS. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
a memory configured to store instructions; and
a processor configured to execute the instructions to configure the processor to:
obtain a first heat map feature and a first coordinate value feature based on a face image;
generate a first fusion heat map feature by fusing the first heat map feature with a first transformation heat map feature obtained by transforming the first coordinate value feature into a heat map feature type;
generate a first fusion coordinate value feature by fusing the first coordinate value feature with a first transformation coordinate value feature obtained by transforming the first heat map feature into a coordinate value feature type; and
detect a face key point based on the first fusion heat map feature and the first fusion coordinate value feature, the detecting comprising:
obtain a heat map of the face key point based on the first fusion heat map feature;
obtain coordinate value information of the face key point based on the first fusion coordinate value feature; and
detect the face key point by obtaining coordinates of the face key point based on the heat map of the face key point and the coordinate value information of the face key point.

2. The electronic device of claim 1, wherein the processor is further configured to obtain the coordinates of the face key point by performing any one of preferential output, an arithmetic mean operation, or a weighted mean operation on coordinates corresponding to the heat map of the face key point and coordinates corresponding to the coordinate value information of the face key point.

3. The electronic device of claim 1, wherein the processor is further configured to:
obtain a second heat map feature based on the first fusion heat map feature;
obtain a second coordinate value feature based on the first fusion coordinate value feature;

generate a second fusion heat map feature by fusing the second heat map feature with a second transformation heat map feature obtained by transforming the second coordinate value feature into the heat map feature type;
generate a second fusion coordinate value feature by fusing the second coordinate value feature with a second transformation coordinate value feature obtained by transforming the second heat map feature into the coordinate value feature type; and
detect the face key point based on the second fusion heat map feature and the second fusion coordinate value feature.

4. The electronic device of claim 3, wherein the processor is further configured to:
obtain a heat map of the face key point based on the second fusion heat map feature;
obtain coordinate value information of the face key point based on the second fusion coordinate value feature; and
detect the face key point by outputting coordinates of the face key point based on the heat map of the face key point and the coordinate value information of the face key point.

5. The electronic device of claim 1, wherein the processor is further configured to:
obtain a first feature comprising information on a generic feature of the face based on the face image;
obtain a second feature associated with the first heat map feature and a third feature associated with the first coordinate value feature based on the first feature;
obtain the first heat map feature based on the second feature; and
obtain the first coordinate value feature based on the third feature.

6. The electronic device of claim 5, wherein the processor is further configured to:
perform any one of resolution segmentation, channel segmentation, or duplication on the first feature; and
obtain the second feature and the third feature based on a result of the performing.

7. The electronic device of claim 1, wherein the processor is further configured to detect the face key point based on a lightweight neural network-based heat map regression model and a lightweight neural network-based coordinate value regression model.

8. The electronic device of claim 1, wherein the processor is further configured to:
generate the first fusion heat map feature by performing element level multiplication, element level addition, channel splicing, or pixel splicing on the first transformation heat map feature and the first heat map feature; and
generate the first fusion coordinate value feature by performing another element level multiplication, element level addition, channel splicing, or pixel splicing on the first transformation coordinate value feature and the first coordinate value feature.

9. An operating method of an electronic device, the operating method comprising:
obtaining, based on a face image, a first heat map feature and a first coordinate value feature;
generating a first fusion heat map feature by fusing the first heat map feature with a first transformation heat map feature obtained by transforming the first coordinate value feature into a heat map feature type;
generating a first fusion coordinate value feature by fusing the first coordinate value feature with a first transformation coordinate value feature obtained by transforming the first heat map feature into a coordinate value feature type; and detecting, based on the first fusion heat map feature and the first fusion coordinate value feature, a face key point, wherein the detecting comprises:

obtaining, based on the first fusion heat map feature, a heat map of the face key point;

obtaining, based on the first fusion coordinate value feature, coordinate value information of the face key point; and detecting, based on the heat map of the face key point and the coordinate value information of the face key point, the face key point by obtaining coordinates of the face key point.

10. The operating method of claim 9, wherein the detecting of the face key point by obtaining the coordinates of the face key point comprises obtaining the coordinates of the face key point by performing any one of preferential output, an arithmetic mean operation, or a weighted mean operation on coordinates corresponding to the heat map of the face key point and coordinates corresponding to the coordinate value information of the face key point.

11. The operating method of claim 9, wherein the detecting, based on the first fusion heat map feature and the first fusion coordinate value feature, of the face key point comprises:

obtaining, based on the first fusion heat map feature, a second heat map feature;

obtaining, based on the first fusion coordinate value feature, a second coordinate value feature;

generating a second fusion heat map feature by fusing the second heat map feature with a second transformation heat map feature obtained by transforming the second coordinate value feature into the heat map feature type;

generating a second fusion coordinate value feature by fusing the second coordinate value feature with a second transformation coordinate value feature obtained by transforming the second heat map feature into the coordinate value feature type; and detecting the face key point based on the second fusion heat map feature and the second fusion coordinate value feature.

12. The operating method of claim 11, wherein the detecting, based on the second fusion heat map feature and the second fusion coordinate value feature, of the face key point comprises:

obtaining, based on the second fusion heat map feature, a heat map of the face key point;

obtaining, based on the second fusion coordinate value feature, coordinate value information of the face key point; and detecting, based on the heat map of the face key point and the coordinate value information of the face key point, the face key point by outputting coordinates of the face key point.

13. The operating method of claim 9, wherein the obtaining of the first heat map feature and the first coordinate value feature comprises:

obtaining, based on the face image, a first feature comprising information on a generic feature of the face;

obtaining, based on the first feature, a second feature associated with the first heat map feature and a third feature associated with the first coordinate value feature;

obtaining, based on the second feature, the first heat map feature; and obtaining, based on the third feature, the first coordinate value feature.

14. The operating method of claim 13, wherein the obtaining, based on the first feature, of the second feature associated with the first heat map feature and the third feature associated with the first coordinate value feature comprises:

performing any one of resolution segmentation, channel segmentation, or duplication on the first feature; and obtaining, based on a result of the performing, the second feature and the third feature.

15. The operating method of claim 9, wherein the face key point is detected based on a lightweight neural network-based heat map regression model and a lightweight neural network-based coordinate value regression model.

16. The operating method of claim 9, wherein the generating of the first fusion heat map feature comprises generating the first fusion heat map feature by performing element level multiplication, element level addition, channel splicing, or pixel splicing on the first transformation heat map feature and the first heat map feature, and the generating of the first fusion coordinate value feature comprises generating the first fusion coordinate value feature by performing element level multiplication, element level addition, channel splicing, or pixel splicing on the first transformation coordinate value feature and the first coordinate value feature.

* * * * *